(12) United States Patent
VanderVelde et al.

(10) Patent No.: US 6,437,243 B1
(45) Date of Patent: Aug. 20, 2002

(54) WIREWAY SYSTEM HAVING A PIVOTABLE COVER

(75) Inventors: Charles F. VanderVelde, Frankfort; Donald C. Wiencek, Tinley Park, both of IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/261,881

(22) Filed: Mar. 3, 1999

(51) Int. Cl.$^7$ ................................................ H02G 3/04
(52) U.S. Cl. ...................... 174/68.3; 174/72 R; 174/101
(58) Field of Search .............................. 174/68.3, 72 R, 174/95, 97, 107, 99 R; 428/217

(56) References Cited

U.S. PATENT DOCUMENTS

| | | | | |
|---|---|---|---|---|
| 3,126,444 A | * | 3/1964 | Taylor | 174/101 |
| 3,705,949 A | * | 12/1972 | Weiss | 174/101 |
| 4,640,314 A | * | 2/1987 | Mock | 138/162 |
| 4,898,550 A | * | 2/1990 | Ayer | 439/718 |
| 4,942,271 A | * | 7/1990 | Corsi et al. | 174/101 |
| 4,953,735 A | * | 9/1990 | Tisbo et al. | 220/6 |
| 5,235,136 A | * | 8/1993 | Santucci et al. | 174/68.3 |
| 5,709,249 A | * | 1/1998 | Okada et al. | 138/162 |
| 5,728,976 A | * | 3/1998 | Santucci et al. | 174/135 |
| 6,107,575 A | * | 8/2000 | Miranda | 174/101 |
| 6,107,576 A | * | 8/2000 | Morton et al. | 174/101 |

FOREIGN PATENT DOCUMENTS

DE  3335-844  *  3/1983

* cited by examiner

*Primary Examiner*—Dean A. Reichard
*Assistant Examiner*—W. David Walkenhorst
(74) *Attorney, Agent, or Firm*—Robert A. McCann; Jay A. Saltzman; Christopher S. Clancy

(57) ABSTRACT

The reenterable wireway system of the present invention includes a channel-shaped slotted duct, an integrally co-extruded U-shaped cover assembly and discrete latches. The duct has an elongate base and two substantially parallel duct walls extending generally perpendicularly from the base with each of the walls disposed adjacent respective longitudinal edges thereof. The duct walls include at least a pair of adjacent duct fingers which define a slot permitting selective routing of wires of the bundle. The cover assembly has an elongate planar center element with a plurality of hinges and a plurality of corner elements, which have a first component co-planar with the central element, and a second component depending normal to the first component disposed. The orientation of the first and second components may be changed when the cover is molded to be biased in a "remain-open" position. A plurality of discrete latches are disposed at spaced locations on each respective second component having a locking mechanism which cooperates with the slot between adjacent duct fingers to secure the cover assembly to the duct. Each side of the cover assembly is removably secured to the duct, and the cover assembly may be pivoted in either direction to an open position by unlatching the locking mechanisms disposed on a longitudinal side of the cover assembly and pivoting the cover assembly about an opposite hinge.

23 Claims, 7 Drawing Sheets

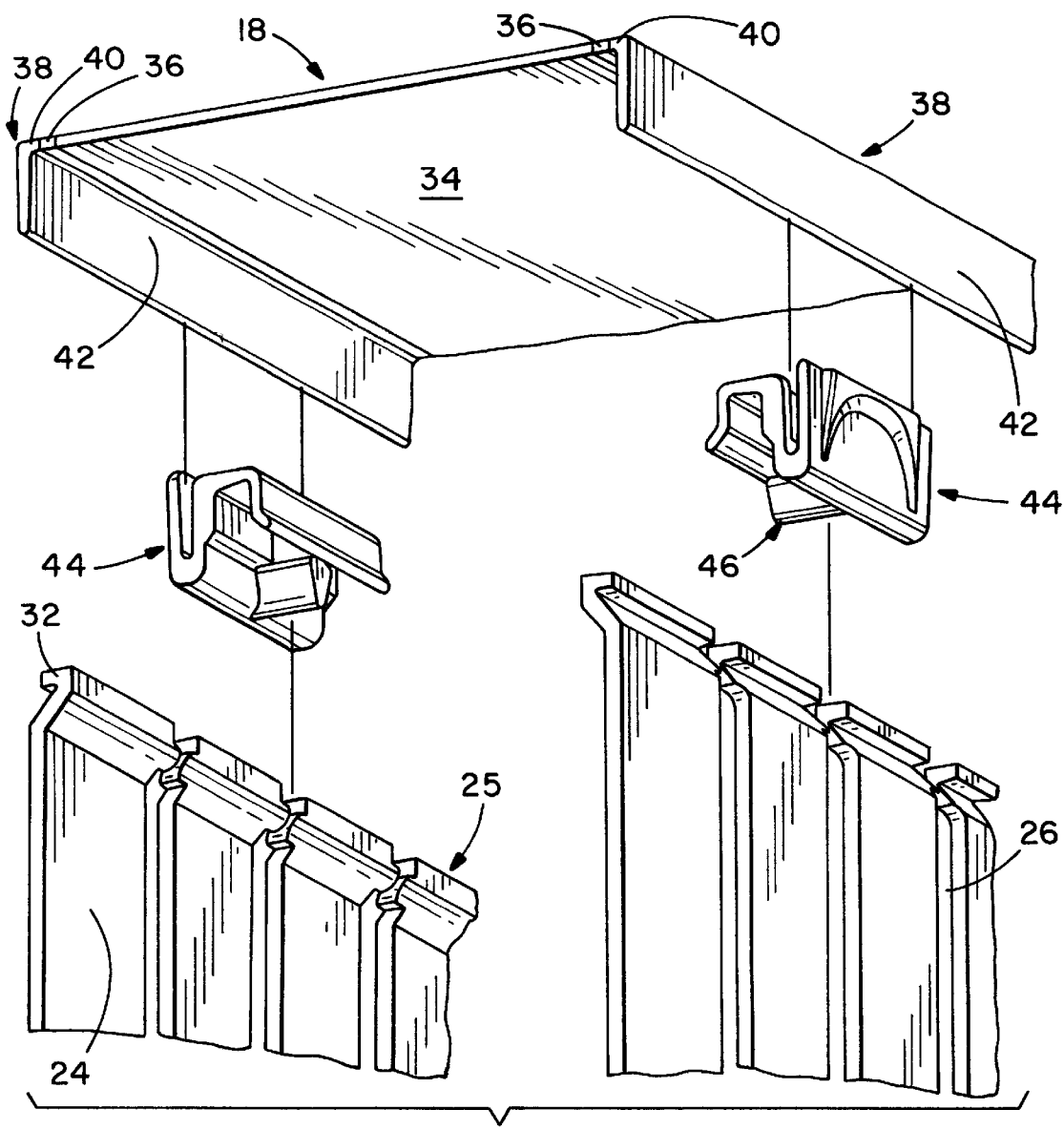
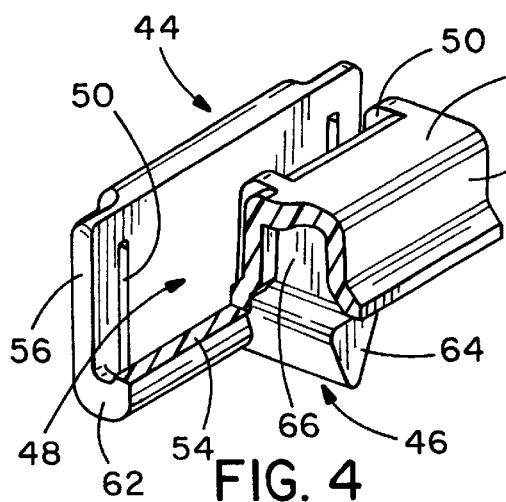
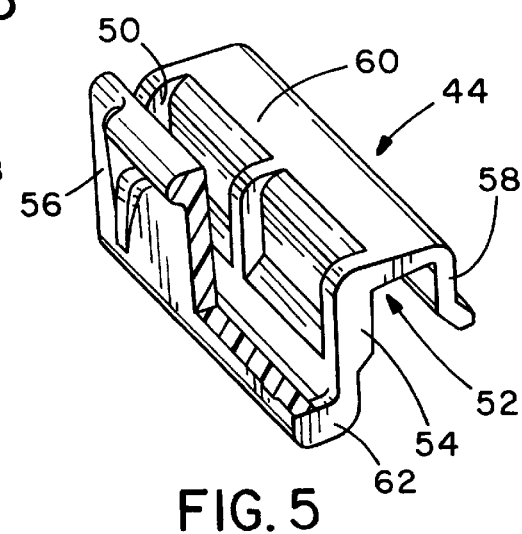

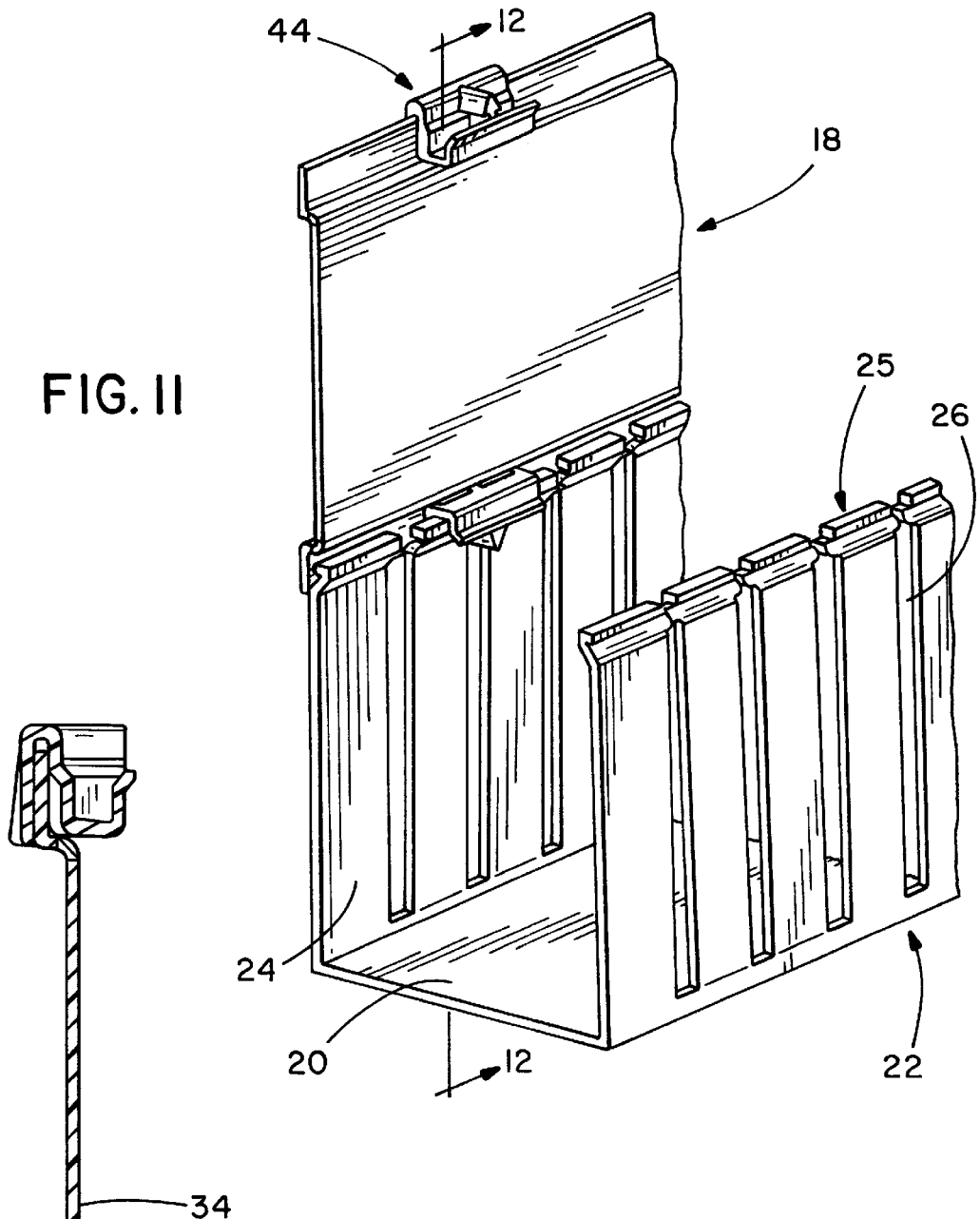
FIG. 11
FIG. 12
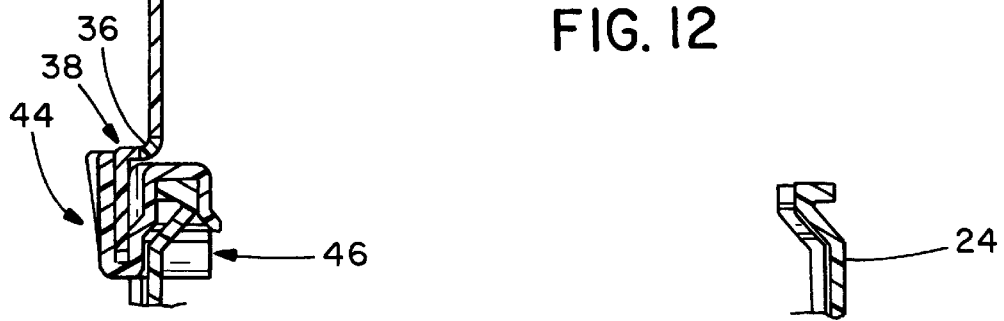

WIREWAY SYSTEM HAVING A PIVOTABLE COVER

TECHNICAL FIELD

The present invention relates to wireway systems and more particularly to such a system including a channel-shaped duct and a cover having a plurality of flexible coextruded hinges and latching elements which is reenterable following installation.

BACKGROUND OF THE INVENTION

Wireway systems including channel-shaped ducts having upstanding fingers constituting slotted sidewalls have come into prominent general use in recent years because of their convenience in channeling, selectively routing and retaining the various wires of a wire bundle interconnecting the components of an electrical system. These ducts typically have a cover for retaining the wires in the duct after completion of the wiring.

The problem encountered with the use of such ducts and semi-permanent covers is that after a channeling and routing installation has been completed, making any changes thereto requires the entire cover member be completely disconnected and removed from the duct and set side in order for any work to begin. Of course, after any changes have been made, the large cover must be reinstalled on the duct, which is a rather difficult and laborious task. As the above slotted duct-type of wire routing system has become the preferred system for the electrical, communication and data transmission industries over the years, and more electrical, communication, and data products have been introduced into the marketplace, the frequency with which the changes to channeling or routing occurs has increased considerably, often daily, and sometimes hourly. Thus, previous designs which require the entire semi-permanent cover member to be completely removed from the duct section, use inflexible one-piece duct systems or have a separate cover with a flexible hinge which is permanently secured to the base and designed to mimic an inflexible one-piece duct have proven to be cumbersome, time consuming, prone to failure, expensive to manufacture or replace, and a general nuisance to installers.

One such prior art design is shown in U.S. Pat. No. 3,890,459 to Caveney, commonly assigned to Panduit Corp., which discloses a slotted duct having a basically permanently installed cover which encloses the duct by either snap-fitting or sliding the cover into engagement with the retaining flange on the distal ends of the duct fingers. The cover must be completely removed in order for an installer to make any changes to the routing of any wires contained therein and likewise reinstalled after changes have been made. The disclosure of U.S. Pat. No. 3,890,459 is incorporated herein by reference.

Another example of prior art duct which attempted to solve the above cumbersome design integrally extruded the channel and channel cover. The two members are interconnected by a thin hinge section, which also forms part of the integral extrusion and is fabricated from the same relatively rigid plastic material forming the associated channel and cover. The hinge is made "thin" to obtain the desired flexibility. This system performs acceptably as long as repeated access to the duct channel is not required such as, when additional cables or cable rewiring is attempted. Hinges extruded from the same material as that of the channel and cover are inherently brittle and are easily fatigued after relatively few closure cycles. Thus, this design is substandard and inadequate in view of the frequency with which wire routing changes are currently observed.

A more recent prior art design essentially permanently combines a conventional U-shaped solid wall or non-slotted duct channel with a cover member having a flexible hinge, in order to simulate the previous one-piece duct arrangement. The advantages of multiple access are afforded by a dual-durometer extrusion on the permanently attached cover, which largely eliminates the breakage problems of the prior art. However, this design also has inherent flaws and shortcomings, most notably, the difficult, expensive, and complex mold shape, the inability to quickly remove either side of the cover, because of the permanent installation and the lack of installation flexibility, two-way opening, or convenience for technicians caused by a cover which only opens in one direction. This design will in fact restrict the capabilities of slotted duct, when installed as taught by Santucci et al., which requires the pivotable cover to be permanently attached to one side of the duct. Slotted duct as described in U.S. Pat. No. 3,890,459 to Caveney above is designed to have wires entering and exiting from both sides of the duct. The installation and rerouting flexibility afforded by this slotted design makes this type of duct so popular. Access to the slots disposed on each side of the duct is absolutely required for the highest level of performance of the duct. Santucci et al. cannot pivot in both directions in order to expose the slots on both sides for manipulation, channeling or routing of the wires contained therein. Consequently, this prior art design is not capable of being incorporated into the slotted duct assembly, since one is incompatible with the design, purpose, and operation of the other.

Therefore, in the design of accessible reenterable wireway system, a simple, partially or completely removable, non-permanent, convenient and flexible design is desired and improvement in the art of wireway systems is needed.

SUMMARY OF THE INVENTION

It is therefore an object of the present invention to provide an accessible, reenterable wireway system in which the combination of a bi-hinged cover and slotted duct channel function as a two-piece wireway system permitting the installer to repeatedly open and close the cover from either side, as required to facilitate the replacement or rerouting of wires and cables therein, while still allowing the cover to be removed from the duct channel, which is desirable.

It is a further object that the present wireway system, when installed on a slotted duct channel, facilitate substantially unlimited access to the duct from either direction, in which the cover may be opened and reclosed on either side numerous times, thereby permitting reconfiguration of the wiring and cables therein.

It is a still further object that the bi-hinged arrangement be provided within the cover assembly, and further that such hinges be integrally formed with the cover such that they will not fatigue or otherwise break upon multiple opening and closing cycles of the wireway system.

It is a still further object that the cover be provided with multiple discrete latches disposed on each side of the cover which releasably engage the slot between adjacent duct fingers.

It is a still further object that the duct cover be integrally molded to be biased in a "remain open" position, whereby the cover when attached to the duct channel will be biased to remain open until closed and latched on an opposite side by the installer.

Briefly, the reenterable wireway system of the present invention includes a channel-shaped slotted duct, an integrally co-extruded U-shaped cover and discrete latches. The duct has an elongate base and two substantially parallel duct walls extending generally perpendicularly from the base with each of the walls disposed adjacent respective longitudinal edges thereof. The duct walls include at least a pair of adjacent duct fingers which define a slot permitting selective routing of wires of the bundle. The cover has an elongate planar center element with a plurality of hinges disposed adjacent respective longitudinal edges thereof, and a plurality of corner elements disposed adjacent respective longitudinal edges of each hinge. The corner elements have a first component co-planar with the central element, and a second component depending normal to the first component disposed adjacent a longitudinal edge of the first component. The orientation of the first and second components may be changed when the cover is molded to be biased in a "remain open" position. A plurality of discrete latches are disposed at spaced locations and secured on each respective second component having a locking mechanism which cooperates with the slot between adjacent duct fingers to secure the cover assembly to the duct. Each side of the cover assembly is removably secured to the duct by depressing each locking mechanism into a locked position in the slot between adjacent duct fingers, and the cover assembly may be pivoted in either direction to an open position by unlatching the locking mechanisms disposed on a longitudinal side of the cover assembly and pivoting the cover assembly about an opposite hinge.

BRIEF DESCRIPTION OF THE DRAWINGS

FIG. 3 is a partial exploded view of the wireway system of FIG. 1;

FIG. 4 is a sectioned detail view of the latch of the wireway system of FIG. 1;

FIG. 5 is a section detail view of the groove of the wireway system of FIG. 1;

FIG. 11 is a partial perspective view of an alternative embodiment of the wireway system of the present invention with the cover extruded such that it is biased in a "remain open" position;

FIG. 12 is an end sectional view of the wireway system of FIG. 11 taken along line 12—12;

Corresponding reference characters indicate corresponding parts throughout the several views of the drawings.

DESCRIPTION OF THE PREFERRED EMBODIMENT

Figure 1:
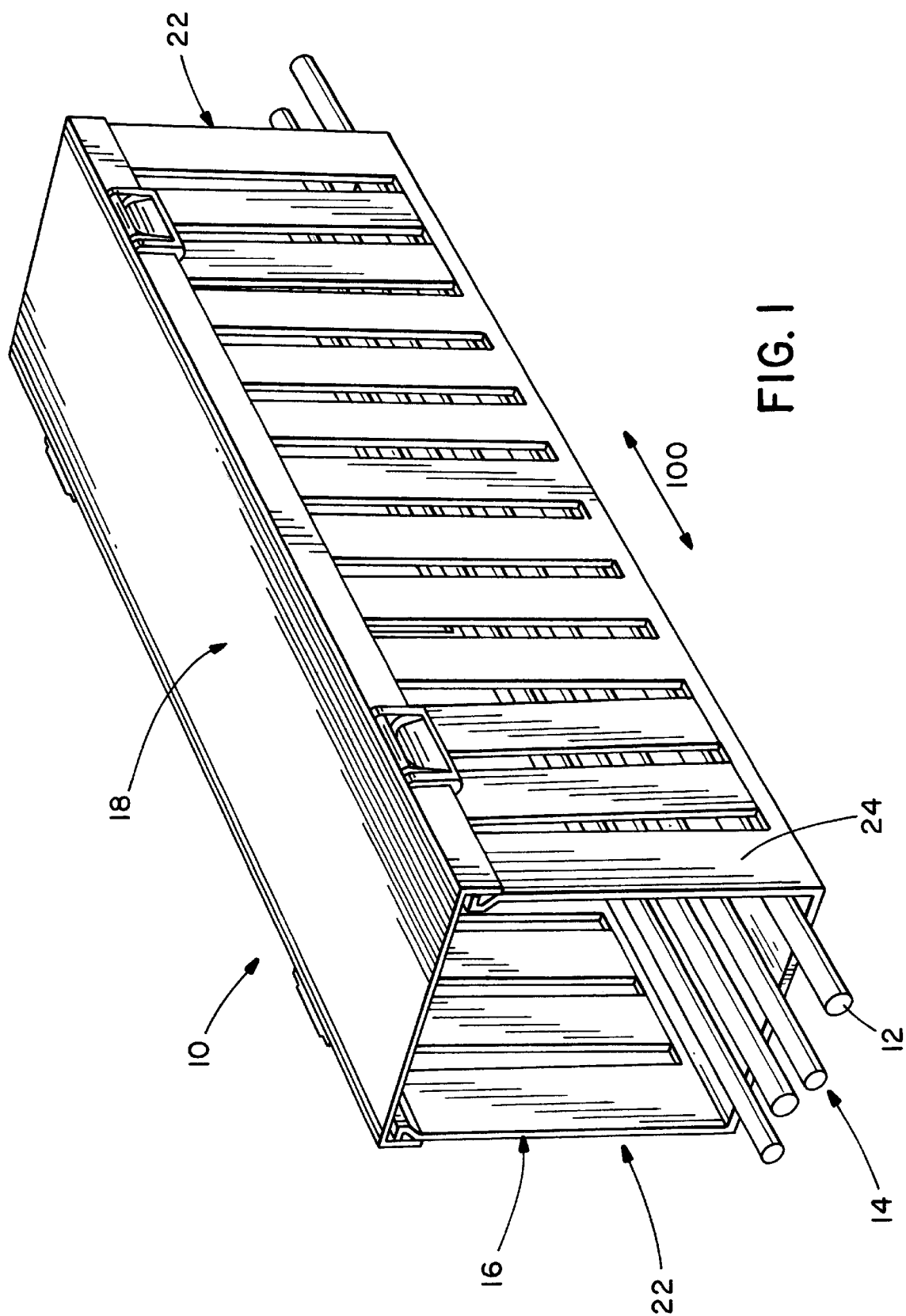
FIG. 1 is a perspective view of the assembled reenterable wireway system of the present invention.

Referring now to FIG. 1 of the drawings, an accessible reenterable wireway system of the present invention for channeling, selectively routing and retaining the various wires 12 of a wire bundle 14 interconnecting components of an electrical system is generally indicated by reference number 10. It is to be understood that the term wire bundle is used in its broad sense and includes any grouping of wires whether or not the wires are bound together as by strings or straps. Wireway system 10 comprises a channel-shaped duct 16 for receiving the wire bundle 14, a cover assembly 18 for enclosing the duct 16 after completion of the wiring, and permitting access to the wires in the duct from either side of the duct. The channel-shaped duct includes one-piece duct and modular duct, the latter of which, after assembly is channel-shaped. Hardware for mounting the wireway system 10 on a panel board, communication rack or the like is not shown.

Figure 2:
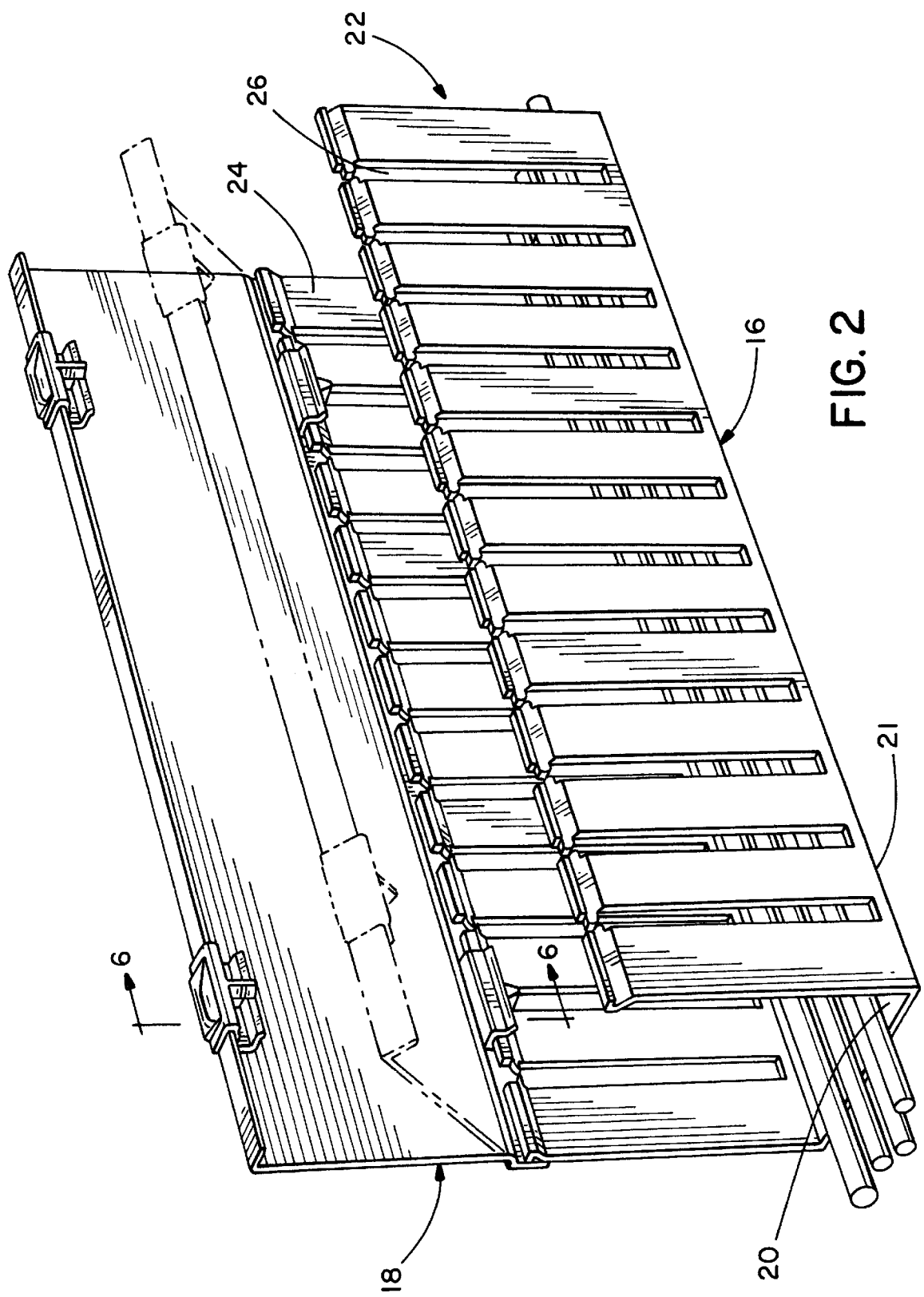
FIG. 2 is a perspective view of the wireway system of FIG. 1 in one open position.
Figure 8:
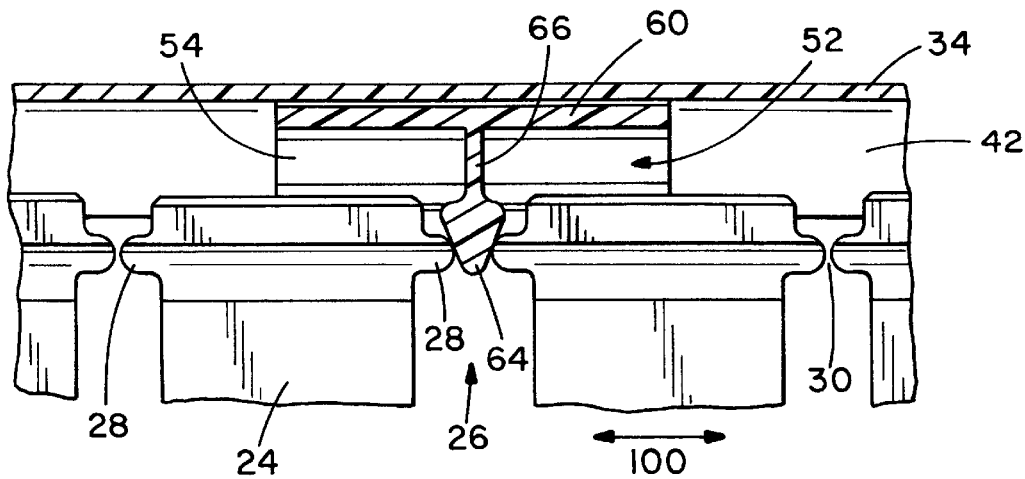
FIG. 8 is a sectional view of the wireway system shown in FIG. 7 taken along line 8—8.
Figure 9:
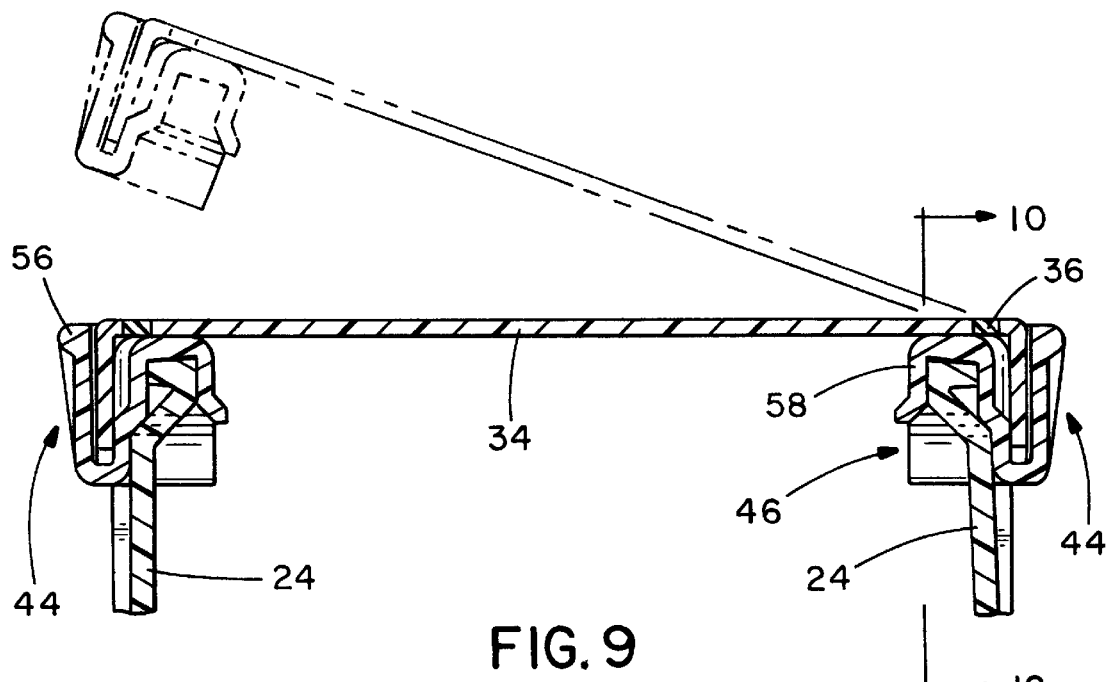
FIG. 9 is an end sectional view of the cover assembly and duct member of the wireway system of FIG. 1 fully engaged.
Figure 10:
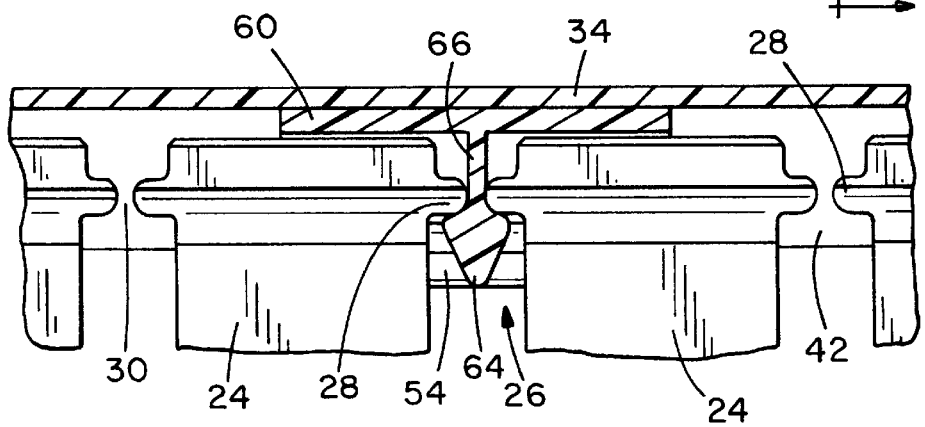
FIG. 10 is a partial sectional view of the fully engaged duct and cover assembly as shown in FIG. 9, taken along line 10—10, which shows in detail the latch duct engagement.
Figure 13:
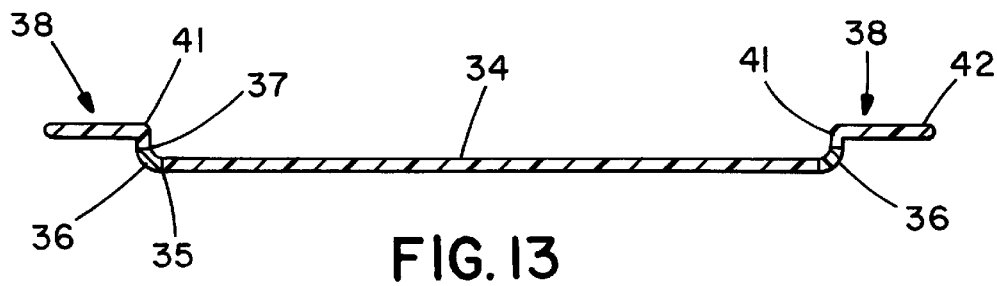
FIG. 13 is an end sectional view of the cover assembly minus latches of the wireway system of FIG. 11.

More particularly, as shown in FIG. 2, duct 16 includes an elongate base 20 and two substantially parallel duct walls 22 extending generally perpendicularly from the base with each of the walls 22 disposed adjacent respective longitudinal edges 21 thereof. The duct walls 22 comprise at least a pair of adjacent duct fingers 24 which define a slot 26 permitting selective routing of various wires 12 of bundle 14. As shown in FIGS. 8 and 10, each duct finger 24 has a pair of ears 28 extending oppositely in the longitudinal direction 100 of the duct 16 with adjacent ears of adjacent duct fingers 24 defining a constricted throat 30 to a corresponding slot 26 defined by the adjacent fingers 24. The width of the throat 30 is preferable less than the diameter of a wire 12 to prevent egress of a wire 12 previously inserted in a slot 26. Duct fingers 24 have distal ends 25 which are resiliently deflectable transversely to the longitudinal direction 100 of the base 20 and wires 12 are routed through the slots 26 by deflecting a finger 24 until the corresponding throat 30 opens sufficiently to permit passage of the wire 12. The ears 28 and throat 30 also serve to secure the cover assembly 18 in place as will be explained below. The wireway system 10 is also suited for vertical mounting, in addition to the horizontal orientation shown.

The cover assembly 18, as shown in FIGS. 3, 6, 7 and 9 is comprised of various parts including a center element 34, hinges 36, corner elements 38, and latches 44. With respect to the term assembly it should be understood that almost all the structural members forming the present cover assembly 18, including the center element 34, hinges 36 and corner elements 38 are integrally fabricated as a single extruded member employing a dual-durometer plastic co-extrusion process as extruders are linked into a single die with some of the extruders supplying the relatively high durometer PVC plastic that forms the corresponding more rigid portions of the cover, for example, the center element 34 and corner elements 38, while the other extruders provide a lower durometer PVC material, preferably Geon 8000 series flexible vinyl, that defines the actual flexible hinges 36 of the corresponding assembly.

Figure 6:
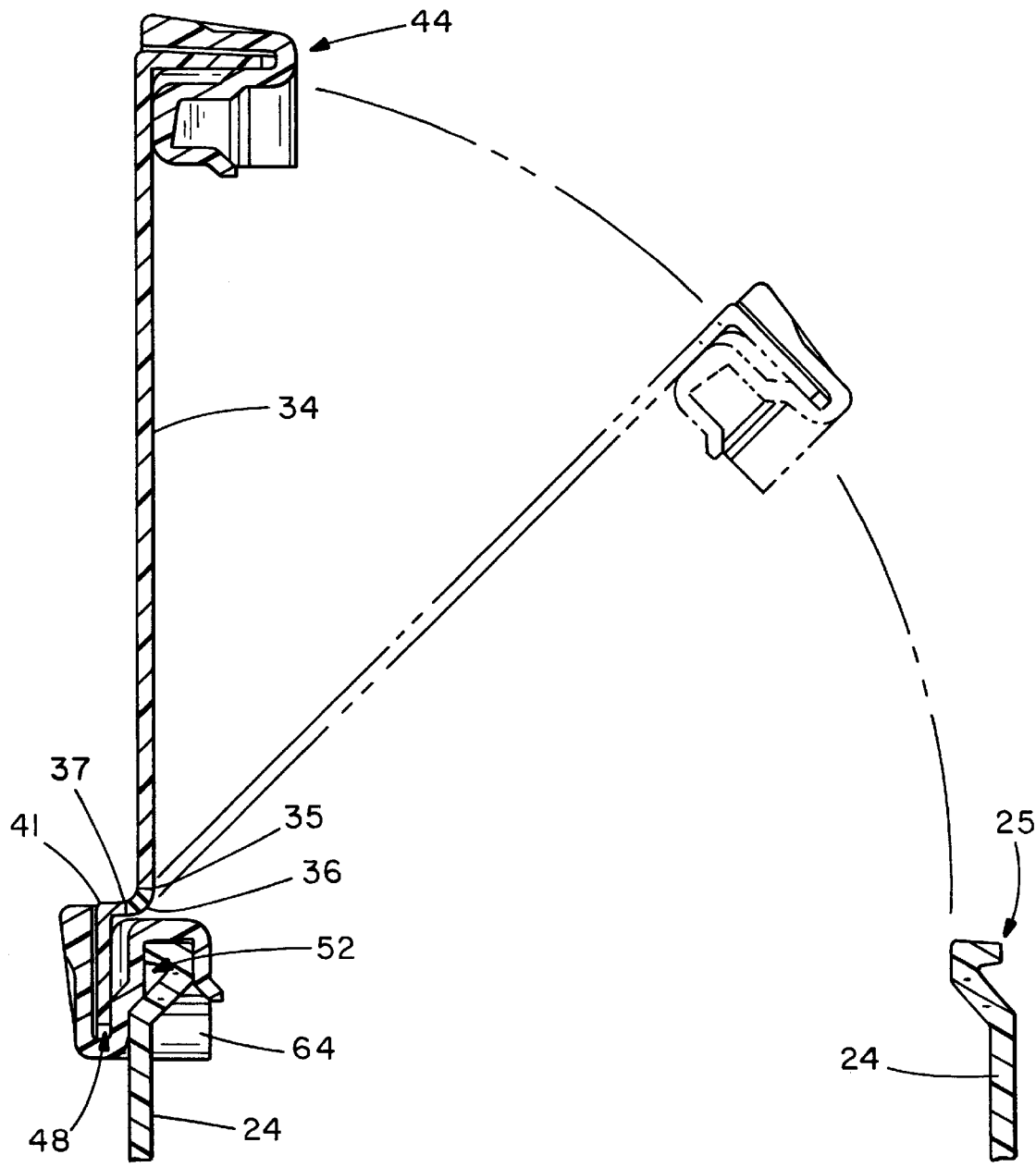
FIG. 6 is a sectional view of the wireway system shown in FIG. 2 taken along line 6—6.
Figure 7:
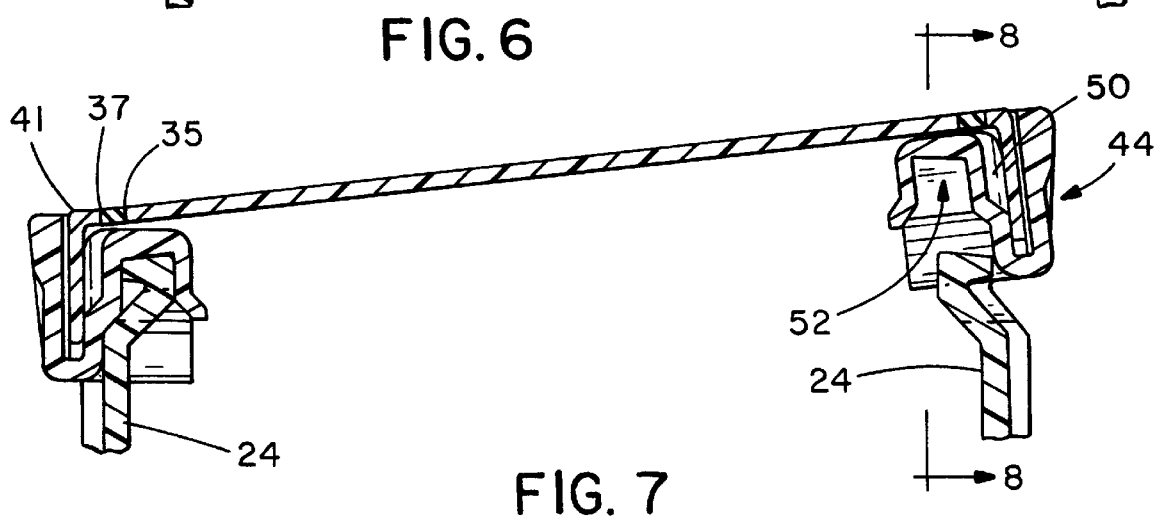
FIG. 7 is an end sectional view similar to FIG. 6 and shows the cover prior to latching or subsequent to unlatching.

The elongate, planar center element 34 forms the main portion of the cover assembly 18 wherein a flexible vinyl hinge 36 is disposed adjacent each respective longitudinal edge 35 thereof in the manner described above. The corner elements 38 are disposed adjacent each respective longitudinal edge 37 of the flexible vinyl hinges 36, and include a first component 40 and a second component 42. In the first embodiment of the invention, shown in FIGS. 1–10, the first component 40 is co-extruded adjacent a longitudinal edge 37 of a hinge 36 co-planar with the center element 34, and the second component 42 depends normal thereto disposed adjacent the longitudinal edge 41 of the first component 40. In this configuration, the extrusion spring biases the cover assembly 18 into a "remain closed" position as shown in FIG. 7, which in its natural state of rest when one set of latches 44 are attached to one duct wall 22 disposes the other set of latches 44 merely adjacent the distal ends 25 of the duct fingers 24 of the opposite duct wall 22. An open position, as shown in FIGS. 2 and 6, requires the assistance of an installer or other device in order to maintain the cover assembly's vertical orientation.

In an alternative embodiment of the invention shown in FIGS. 11–15, each first component 40 and hinge 36 are extruded such that each flexible hinge 36 is arcuately-shaped, curved upwardly, and spring biased to dispose the first component 40 normal to the center element 34 while still disposed adjacent a longitudinal edge 37 of each flexible hinge 36. The second component 42 remains normal to the first component 40 adjacent a longitudinal edge 41 of the first component 40, however, it is now oriented parallel to the central element 34. The extrusion in this alternative embodiment spring biases the cover assembly 18 into a "remain open" position, as shown in FIGS. 11 and 12, where the cover assembly 18, when installed on one duct wall 22, will maintain a nearly vertical orientation without any external assistance.

As best shown in FIGS. 4 and 5, preferably a plurality of discrete latches 44 are disposed at spaced locations on each respective second component 42 for securing the cover assembly 18 to the duct 16. The structural composition of the latches 44 includes a centrally disposed main web 54, an outer web 56 linked to the main web 54 by a bottom portion 62, and an inner web 58 linked to the main web 54 by a top portion 60. A groove 48 disposed between the main web 54 and outer web 56 is further defined on one side by bottom portion 62. Elongate beads 50 are formed within the groove 48 disposed on the main web 54 and outer web 56 in order to provide material for the latches 44 to be ultrasonically welded to the second component 42 in a conventional manner. Various other methods of securing the latches 44 to the second component 42 may be provided, such as, but not shown, an adhesive glue, an adhesive tape, and a threaded fastener. A receptacle 52 is defined on the latch 44 by the main web 54, inner web 58, and the top portion 60. Centrally disposed within the receptacle 52 is a locking mechanism 46 including a strut 66 depending from the top portion 60 and integral with the main web 54 and an inner web 58, and a arrowhead-shaped distal portion 64 integrally formed with the main web 54. The distal portion 64 may have any configuration which may be required to obtain a positive retention association between the latches 44 and duct walls 22.

In operation, after the duct 16 has been secured to the desired surface, not shown, the wires 12 of wire bundle 14 may be channeled and routed to their proper destinations, and the cover assembly 18 may be firmly attached to the duct walls 22. This is accomplished by longitudinally positioning one edge of the cover assembly 18 in alignment with a corresponding duct wall 22 and associating the locking mechanism 46 of each latch 44 with the ears 28 and throat 30 disposed in a slot 26 between adjacent duct fingers 24. By further depressing each latch 44 the distal portion 64 is forced through the throat 30 and is finally disposed below the adjacent ears 28, as shown in FIG. 10. When the installation of each latch 44 is completed, ears 28 of adjacent duct fingers 24 contact the locking mechanism strut 66. In order to secure the opposite side of the cover assembly 18, the installer pivots the cover assembly 18 about the flexible hinge 36 adjacent the previously installed side, and repeats the latch installation procedure outlined above. Once this has been accomplished, the initial installation procedure has been completed.

As changes are required in channeling or rerouting of the wires 12, the installer merely detaches the latches 44 disposed along one longitudinal edge of the cover assembly 18 and pivots the cover assembly 18 about an opposite flexible hinge 36 in order to gain access and reenter the duct to make the above changes in channeling or rerouting of wires 12. Re-attachment is as described above. Another advantage of this invention is that to use the slotted duct 16 to its fullest potential the cover assembly 18 may be detached from either duct wall 22 and pivoted about an oppositely disposed flexible hinge 36. Thus, access to the wires 12 which enter or exit from either side of the duct may be obtained and rerouting thereof is simplified.

Figure 14:
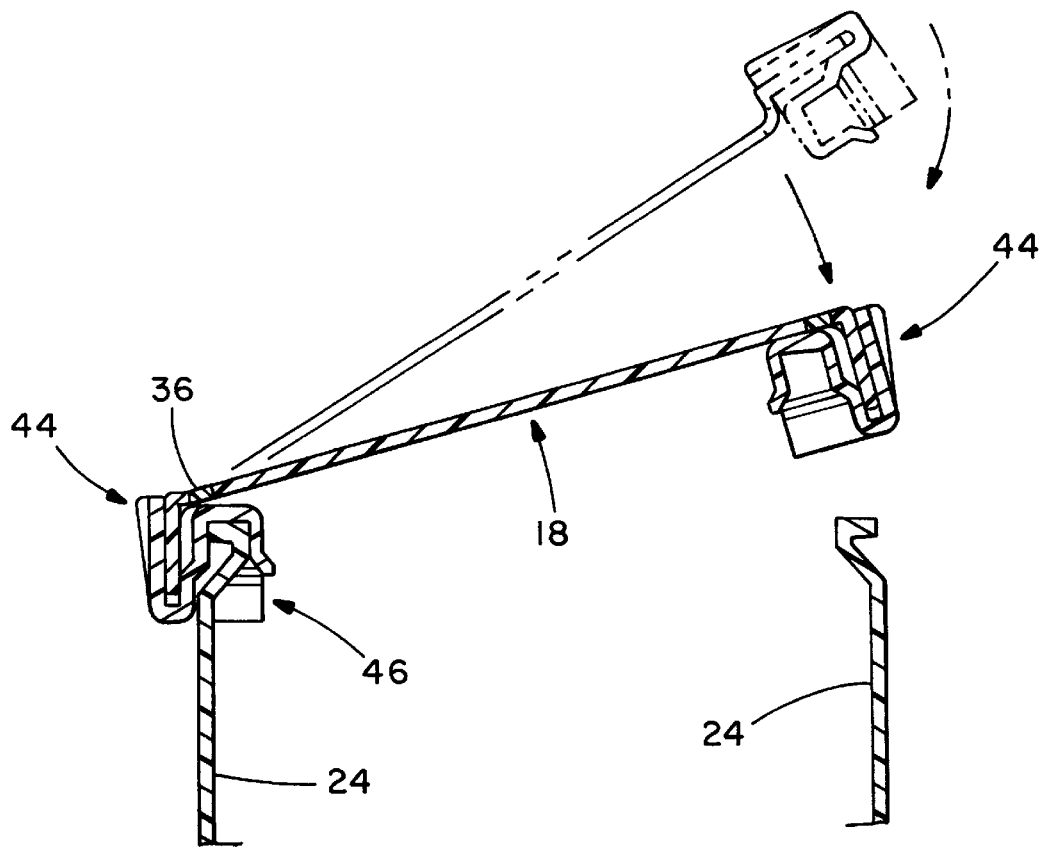
FIG. 14 is an end sectional view of the wireway system of FIG. 11 showing attachment of the opposite side of the cover assembly to the duct channel.
Figure 15:
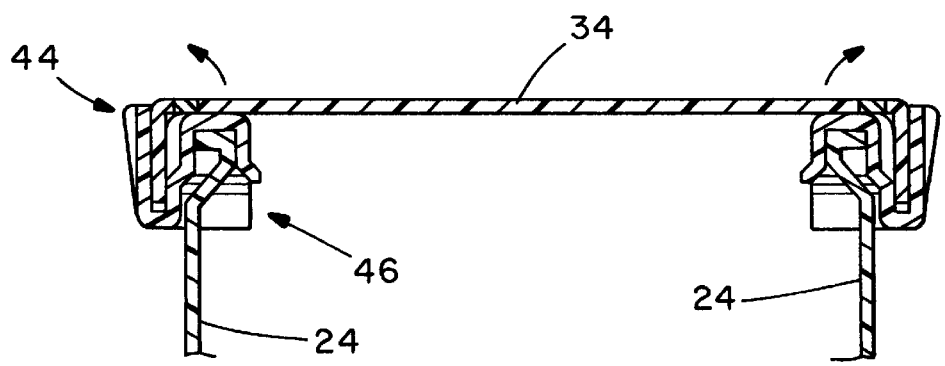
FIG. 15 is an end sectional view of the wireway system of FIG. 11 fully assembled.

The alternative embodiment, as shown in FIGS. 11 through 15, adds the further advantage of a "remain open" position extruded into the cover assembly 18 as described in detail above. Obviously, the installer would be free to use both hands rather than having to hold the cover assembly 18 open or using an external device to accomplish such a task. Otherwise, the cover assembly of the alternative embodiment is attached, detached, and functions in the same way and manner as that of the first embodiment, with the addition of a ninety degree rotation of the unattached longitudinal side before securement as shown in FIG. 14.

While the particular embodiment of the present invention has been shown and described, it will be obvious to those skilled in the art that changes and modifications may be made without departing from the invention and its broader aspects. The matter set forth in the foregoing description and accompanying drawings is offered by way of illustration only and not as a limitation.

What is claimed is:

1. A pivotable duct cover assembly for a wireway system for channeling, selectively routing and retaining various cables of a cable bundle for interconnecting components of a communication system, said wireway system including a channel-shaped duct having a pair of substantially parallel duct walls having at least a pair of adjacent duct fingers which define a slot permitting selective routing of various cables of the bundle, said cover assembly comprising:

an integrally co-extruded U-shaped cover for enclosing the duct, the cover comprising an elongated planar center element, a pair of opposed hinges disposed adjacent respective longitudinal edges thereof, a plurality of corner elements disposed adjacent respective longitudinal edges of each hinge, each of said corner elements having a first component co-planar with the central element, and a second component normal to the first component disposed adjacent a longitudinal edge of the first component, and a plurality of discrete latches disposed at spaced locations on each respective second component, each of said discrete latches having a locking mechanism operatively associated with the slot between said adjacent duct fingers, whereby the cover assembly is removably secured to said walls of the duct by depressing each locking mechanism into a locked position in the slot between said adjacent duct fingers, and whereby the cover assembly may be pivoted in either direction to an open position by unlatching the locking mechanisms disposed on a longitudinal side of the cover assembly proximate one of said pair of hinges and pivoting the cover assembly about said opposite one of said pair of hinges.

2. The pivotable duct cover assembly of claim 1, wherein the plurality of discrete latches further include a groove for receiving each respective second component, mounting means disposed within the groove, and a receptacle for housing each respective locking mechanism and capturing a pair of distal ends of said adjacent duct fingers when the locking mechanism is disposed between said adjacent duct fingers.

3. The pivotable duct cover assembly of claim 2, wherein the mounting means further comprises beads which are sonically welded to each respective second component to secure each respective latch.

4. The pivotable duct cover assembly of claim 2, wherein the mounting means further comprises an adhesive glue to secure each respective latch to each respective second component.

5. The pivotable duct cover assembly of claim 2, wherein the mounting means further comprises an adhesive tape to secure each respective latch to each respective second component.

6. The pivotable duct cover assembly of claim 2, wherein said mounting means further comprises a threaded fastener to secure each respective latch to each respective second component.

7. The pivotable duct cover assembly of claim 1 wherein at least one of said hinges is of relatively lower durometer than said center elements.

8. A reenterable wireway system for channeling, selectively routing and retaining various cables of a cable bundle for interconnecting components of a communication system, said wireway system comprising:

a channel-shaped duct for receiving the cable bundle and having an elongate base and two substantially parallel duct walls extending generally perpendicularly from the base with each of the walls disposed adjacent respective longitudinal edges thereof, duct walls having at least a pair of adjacent duct fingers which define a slot permitting selective routing of various cables of said bundle; and a cover assembly comprising an integrally co-extruded U-shaped cover for enclosing the duct, the cover including an elongate planar center element, a pair of opposed hinges disposed adjacent respective longitudinal edges thereof, a plurality of corner elements disposed adjacent respective longitudinal edges of each hinge, each of said corner elements having a first component co-planar with the central element, and a second component normal to the first component disposed adjacent a longitudinal edge of the first component, and a plurality of discrete latches disposed at spaced locations on each respective second component, each of said discrete latches having a locking mechanism operatively associated with the slot between said adjacent duct fingers, whereby the cover assembly is removably secured to both walls of the duct by depressing each respective locking mechanism into a locked position in the slot between adjacent duct fingers, and whereby the cover assembly may be pivoted in either direction to an open position by unlatching the locking mechanisms disposed on a longitudinal side of the cover assembly proximate one of said pair of hinges and pivoting the cover assembly about said opposite one of said pair of hinges.

9. The reenterable wireway system of claim 8 further including duct fingers having distal ends, and at least one finger having an ear adjacent its distal end extending toward the other finger to define a restricted throat to the slot.

10. The reenterable wireway system of claim 8, wherein the plurality of discrete latches further include a groove for receiving each respective second component, mounting means disposed within the groove, and a receptacle for housing each respective locking mechanism and capturing a pair of distal ends of said adjacent duct fingers when each respective locking mechanism is disposed between said adjacent duct fingers.

11. The reenterable wireway system of claim 10, wherein the mounting means further comprises beads which are sonically welded to each respective second component to secure each respective latch.

12. The reenterable wireway system of claim 10, wherein the mounting means further comprises an adhesive glue to secure each respective latch to each respective second component.

13. The reenterable wireway system of claim 10, wherein the mounting means further comprises an adhesive tape to secure each respective latch to each respective second component.

14. The reenterable wireway system of claim 10, wherein said mounting means further comprises a threaded fastener to secure each respective latch to each respective second component.

15. The reenterable wireway system of claim 8 wherein at least one of said hinges is of relatively lower durometer than said center element.

16. A reenterable wireway system for channeling, selectively routing and retaining various cables of a cable bundle for interconnecting components of a communication system, said wireway system comprising:

a channel-shaped duct for receiving the cable bundle and having an elongate base and two substantially parallel duct walls extending generally perpendicularly from the base with each of said walls disposed adjacent respective longitudinal edges thereof, duct walls having at least a pair of adjacent duct fingers which define a slot permitting selective routing of various cables of said bundle; and a cover assembly comprising an integrally co-extruded U-shaped cover for enclosing the duct, the cover including an elongate planar center element, a pair of opposed hinges disposed adjacent respective longitudinal edges thereof, a plurality of corner elements disposed adjacent respective longitudinal edges of each hinge, having a first component normal to the central element, and a second component parallel to the central element extending normal to the first component disposed adjacent a longitudinal edge of the first component, whereby the cover assembly is removably secured to said walls of the duct in a remain open position by depressing each respective locking mechanism disposed along one of the longitudinal edges of the cover assembly into a locked position in the slot between adjacent duct fingers, and whereby the opposite longitudinal edge of the cover is removably secured to the duct by pivoting the opposite longitudinally-aligned latches 90 degrees and depressing each respective locking mechanism into a locked position in the slot between said adjacent duct fingers disposed along the opposite wall, and whereby the cover assembly may be pivoted in either direction to an open position by unlatching each respective locking mechanism on a longitudinal side of the cover assembly proximate one of said pair of hinges and pivoting the cover assembly about said opposite one of said pair of hinges.

17. The reenterable wireway system of claim 16, further including duct fingers having distal ends, and at least one finger having an ear adjacent its distal end extending toward the other finger to define a restricted throat to the slot.

18. The reenterable wireway system of claim 16, wherein the plurality of discrete latches further include a groove for receiving each respective second component, mounting means disposed within the groove, and a receptacle for housing the locking mechanism and capturing a pair of distal ends of adjacent duct fingers when each respective locking mechanism is disposed between the adjacent duct fingers.

19. The reenterable wireway system of claim 18, wherein the mounting means further comprises beads which are sonically welded to each respective second component to secure each respective latch.

20. The reenterable wireway system of claim 18, wherein the mounting means further comprises and adhesive glue to secure each respective latch to each respective second component.

21. The reenterable wireway system of claim 18, wherein the mounting means further comprises an adhesive tape to secure each respective latch to each respective second component.

22. The reenterable wireway system of claim 18, wherein said mounting means further comprises a threaded fastener to secure each respective latch to each respective second component.

23. The reenterable wireway system of claim 16 wherein at least one of said hinges is of relatively lower durometer than said center element.

* * * * *